March 14, 1933. K. E. PORTER 1,901,611
DRIP COFFEE MAKER
Filed Feb. 5, 1931

Inventor
Kirk E. Porter
By Frease and Bishop
Attorneys

Patented Mar. 14, 1933

1,901,611

UNITED STATES PATENT OFFICE

KIRK E. PORTER, OF WOOSTER, OHIO, ASSIGNOR TO THE BUCKEYE ALUMINUM COMPANY, OF WOOSTER, OHIO, A CORPORATION OF OHIO

DRIP COFFEE MAKER

Application filed February 5, 1931. Serial No. 513,545.

The invention relates to devices for making drip coffee by passing boiling water through the ground coffee, and more particularly to a novel type of spreader or pressure plate for compacting the ground coffee and spreading the boiling water through the same.

The object of the improvement is to provide a tubular container adapted to be suspended within the upper end of a coffeepot or other receptacle to receive the coffee beverage, the lower portion of the container constituting a ground coffee compartment or chamber, a removable, perforated pressure or spreader plate being adapted to be placed upon the top of the ground coffee, the upper portion of the tubular container constituting a hot water reservoir or compartment.

Another object of the improvement is to provide a reversible spreader or pressure plate having a peripheral skirt or other means whereby the plate may be spaced above the level of the ground coffee or reversed to rest tightly against the same in order to make infusions of different strength, as well as to accommodate the making of large or small quantities of coffee as desired.

Another object of the improvement is to provide a reversible handle for the perforated spreader or pressure plate whereby the same may be easily handled to be placed in the tubular container in either position.

A still further object is to so shape and construct the spreader or pressure plate that it will have a running fit within the tubular container whereby the pressure plate may be placed tightly in contact with the top of the ground coffee therein but will be permitted to move upward in the container due to the expansion of the ground coffee in contact with the boiling water.

Figure 1:
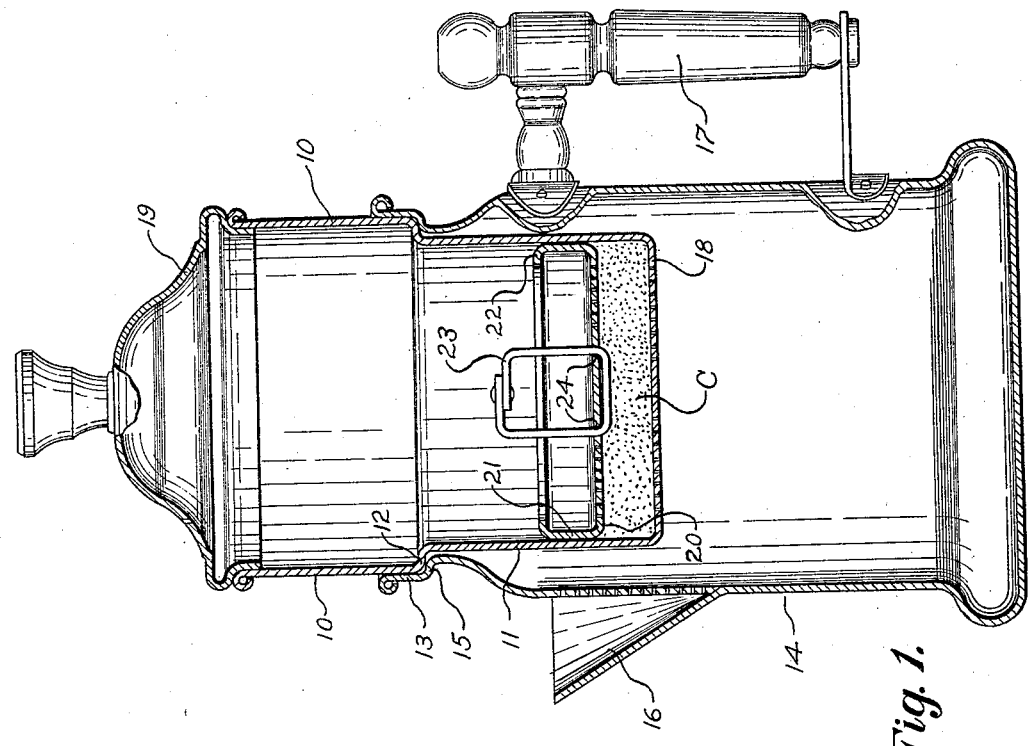
Figure 2:
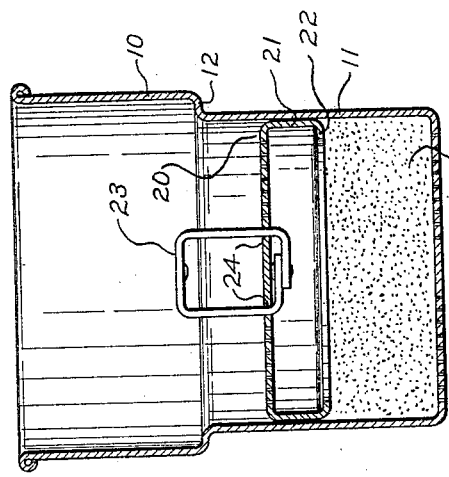

The above and other objects may be attained by constructing the improved coffee maker in the manner illustrated in the accompanying drawing, in which Figure 1 is a vertical sectional view of the improved coffee maker showing the pressure plate in direct contact with the ground coffee, as used for preparing a strong infusion of coffee or in cases where only a small amount of coffee is being made; and Fig. 2, a vertical sectional view through the tubular container and pressure plate showing the pressure plate in the inverted position and spaced away from the ground coffee by means of the peripheral skirt, as used for making a weaker infusion of coffee or in cases where a large amount of coffee is being made.

Similar numerals refer to similar parts throughout the drawing.

The improved coffee maker includes the substantially tubular container 10, the lower portion of which may be somewhat reduced in diameter, as indicated at 11, providing the annular shoulder 12 adapted to be received within the neck portion 13 of a coffeepot or the like indicated generally at 14, and to rest upon the annular shoulder 15 thereof so as to support the tubular container within the upper end portion of the coffeepot, as best shown in Fig. 1.

This coffeepot may be provided with a pouring spout 16 and with the diametrically oppositely located handle 17 by means of which the coffeepot may be handled in customary manner.

The bottom wall 18 of the tubular container 10 is perforated substantially throughout its entire surface, and the upper open end of the tubular container may be arranged to be closed as by the lid 19.

The spreader or pressure plate indicated generally at 20 may be in the form of a disk perforated substantially over its entire surface and provided at its periphery with an annular skirt 21 of such diameter that the same will have a running fit within the reduced lower portion 11 of the tubular container. This skirt may have its free end turned inward as indicated at 22.

A handle may be provided for the pressure plate in the form of a strap of sheet metal or the like, formed into substantially rectangular shape, as shown at 23, and slidably located through apertures 24 in the pressure plate, whereby the handle may be moved to either position, as shown in Figs. 1 and 2.

In the operation of the device, ground coffee, as indicated at C, is placed in the lower end of the container 10 and the perforated spreader and pressure plate is then placed in the container upon the coffee.

If a small amount of coffee is being made or if it is desired to make the coffee particularly strong, the pressure plate is inverted with the skirt upward, as shown in Fig. 1, and placed directly against the upper surface of the ground coffee, thus compacting and compressing the ground coffee so that the boiling water which is then poured into the upper portion of the container will pass through the ground coffee slowly, absorbing substantially all of the strength therefrom.

As the ground coffee expands from contact with the boiling water, it will move the pressure plate upward within the container sufficiently to compensate for this expansion.

Where a large amount of coffee is to be made or if it is desirable to make the coffee of less strength than as above described, the pressure plate may be turned with the skirt downward and placed upon the ground coffee as shown in Fig. 2, the lower end of the skirt resting upon the ground coffee. The handle 23 being movable to either position, as shown in Figs. 1 and 2, permits the pressure plate to be easily handled in either position.

In the position shown in Fig. 2, it will be seen that the ground coffee may expand considerably within the confines of the skirt 21 without moving the pressure plate upward. In this way the coffee is not held as compactly as shown in Fig. 1, thus permitting the boiling water to pass through the same more freely and quickly and extracting less strength from the ground coffee than is obtained where the pressure plate is inverted as shown in Fig. 1.

I claim:

1. A drip coffee maker including a tubular container open at its upper end and having a perforated bottom wall, the said upper end of the container constituting a water receiving compartment and the said lower end constituting a ground coffee receiving compartment, a reversible, perforated pressure plate adapted to be disposed between the water receiving compartment and the ground coffee compartment and arranged to be placed in one position to contact directly with the ground coffee, means upon the pressure plate for spacing said pressure plate above the ground coffee when placed in the reverse position, and a handle slidably located through the pressure plate and adapted to be moved to position upon either side of the pressure plate.

2. A drip coffee maker including a tubular container open at its upper end and having a perforated bottom wall, the said upper end of the container constituting a water receiving compartment and the said lower end constituting a ground coffee receiving compartment, a reversible, perforated pressure plate adapted to be disposed between the water receiving compartment and the ground coffee compartment and arranged to be placed in one position to contact directly with the ground coffee, a skirt upon the pressure plate for spacing said pressure plate above the ground coffee when placed in the reverse position, and a handle slidably located through the pressure plate and adapted to be moved to position upon either side of the pressure plate.

3. A drip coffee maker including a hot water container, a ground coffee container communicating therewith and a pot adapted to communicate with the ground coffee container, and a perforate reversible spreader adapted to be received within the ground coffee container for retaining different quantities of ground coffee therein and a reversible handle upon said spreader.

In testimony that I claim the above, I have hereunto subscribed my name.

KIRK E. PORTER.